(12) United States Patent
Ballantine et al.

(10) Patent No.: US 12,212,025 B2
(45) Date of Patent: Jan. 28, 2025

(54) AIRCRAFT ELECTRICAL POWER SUPPLY SYSTEM AND METHOD OF SUPPLYING ELECTRICAL POWER IN AN AIRCRAFT

(71) Applicant: OHMIUM INTERNATIONAL, INC., Incline Village, NV (US)

(72) Inventors: Arne Ballantine, Incline Village, NV (US); Franklin Ballantine, Incline Village, CA (US); Glen Benson, San Jose, CA (US); Chockkalingam Karuppaiah, Fremont, CA (US); Kirsten Burpee, San Jose, CA (US); Frederick Paul Freeland, Jr., Port Orchard, WA (US)

(73) Assignee: Ohmium International, Inc., Newark, CA (US)

( * ) Notice: Subject to any disclaimer, the term of this patent is extended or adjusted under 35 U.S.C. 154(b) by 700 days.

(21) Appl. No.: 17/507,156

(22) Filed: Oct. 21, 2021

(65) Prior Publication Data

US 2022/0131165 A1 Apr. 28, 2022

Related U.S. Application Data

(60) Provisional application No. 63/104,225, filed on Oct. 22, 2020.

(51) Int. Cl.
*H01M 8/04* (2016.01)
*B64D 27/24* (2006.01)
(Continued)

(52) U.S. Cl.
CPC ........ *H01M 8/04201* (2013.01); *B64D 27/24* (2013.01); *B64D 37/30* (2013.01);
(Continued)

(58) Field of Classification Search
CPC ......... H01M 8/04201; H01M 8/04014; H01M 8/04126; H01M 8/04447; H01M 8/04649;
(Continued)

(56) References Cited

U.S. PATENT DOCUMENTS 3,374,158 A 3/1968 Lord et al.
4,275,126 A 6/1981 Bergmann et al.
(Continued)

FOREIGN PATENT DOCUMENTS

EP 3028330 B1 6/2016
EP 4232363 A1 8/2023
(Continued)

OTHER PUBLICATIONS

EP Application No. 21883860.5, Extended European Search Report dated Aug. 1, 2024.
(Continued)

*Primary Examiner* — James M Erwin
(74) *Attorney, Agent, or Firm* — Polsinelli LLP (57) ABSTRACT

An aircraft electrical power supply system includes a fuel cell auxiliary power unit (APU) that supplies auxiliary electrical power to an aircraft, a fuel cell power plant that supplies primary electrical power to the aircraft, and a hydrogen storage unit that supplies hydrogen to the fuel cell APU and the fuel cell power plant.

25 Claims, 8 Drawing Sheets

(51) Int. Cl.
| | |
|---|---|
| *B64D 37/30* | (2006.01) |
| *B64F 1/36* | (2017.01) |
| *H01M 8/04014* | (2016.01) |
| *H01M 8/04082* | (2016.01) |
| *H01M 8/04119* | (2016.01) |
| *H01M 8/0444* | (2016.01) |
| *H01M 8/04537* | (2016.01) |
| *H01M 8/04858* | (2016.01) |
| *H01M 8/0656* | (2016.01) |
| *H01M 8/0662* | (2016.01) |
| *H01M 8/249* | (2016.01) |
| *B64D 41/00* | (2006.01) |

(52) U.S. Cl.
CPC ........... *B64F 1/36* (2013.01); *H01M 8/04014* (2013.01); *H01M 8/04126* (2013.01); *H01M 8/04447* (2013.01); *H01M 8/04649* (2013.01); *H01M 8/0494* (2013.01); *H01M 8/0656* (2013.01); *H01M 8/0662* (2013.01); *H01M 8/0681* (2013.01); *H01M 8/249* (2013.01); *B60L 2200/10* (2013.01); *B64D 2041/005* (2013.01); *H01M 2250/20* (2013.01)

(58) Field of Classification Search
CPC ............. H01M 8/0494; H01M 8/0656; H01M 8/0662; B64D 27/355; B64D 37/30; B64D 2041/005
USPC ........................................................ 429/400
See application file for complete search history.

(56) References Cited

U.S. PATENT DOCUMENTS

| | | | |
|---|---|---|---|
| 5,106,035 A | 4/1992 | Langford, III | |
| 6,264,807 B1 | 7/2001 | Fenner et al. | |
| 6,280,865 B1* | 8/2001 | Eisman ............... | H01M 8/0662 429/482 |
| 6,296,957 B1 | 10/2001 | Graage | |
| 6,568,633 B2 | 5/2003 | Dunn | |
| 6,641,084 B1 | 11/2003 | Huber et al. | |
| 6,767,663 B2 | 7/2004 | Li et al. | |
| 6,834,831 B2 | 12/2004 | Daggett | |
| 6,908,702 B2 | 6/2005 | McElroy et al. | |
| 7,045,238 B2 | 5/2006 | Gottmann et al. | |
| 7,201,979 B2 | 4/2007 | McElroy et al. | |
| 7,364,810 B2 | 4/2008 | Sridhar et al. | |
| 8,669,499 B2 | 3/2014 | Conrad | |
| 9,461,320 B2 | 10/2016 | Ballantine et al. | |
| 2003/0180599 A1 | 9/2003 | Kamihara | |
| 2004/0150366 A1 | 8/2004 | Ferrall et al. | |
| 2007/0128478 A1 | 6/2007 | Ballantine et al. | |
| 2007/0158500 A1 | 7/2007 | Sridhar et al. | |
| 2008/0299423 A1 | 12/2008 | Laven | |
| 2011/0198439 A1* | 8/2011 | Rotger ................... | B60L 58/33 244/50 |
| 2013/0306797 A1 | 11/2013 | Dalle Donne et al. | |
| 2017/0073058 A1 | 3/2017 | Fournier et al. | |
| 2018/0141674 A1 | 5/2018 | Bailey et al. | |
| 2019/0225348 A1* | 7/2019 | Salanne ................... | H02J 7/34 |
| 2019/0317152 A1 | 10/2019 | Ballantine et al. | |
| 2020/0239149 A1* | 7/2020 | Rainville .......... | H01M 8/04679 |
| 2021/0155491 A1 | 5/2021 | Ballantine et al. | |
| 2021/0156038 A1 | 5/2021 | Ballantine et al. | |
| 2021/0156039 A1 | 5/2021 | Ballantine et al. | |
| 2021/0179451 A1 | 6/2021 | Ballantine et al. | |
| 2021/0179471 A1 | 6/2021 | Ballantine et al. | |

FOREIGN PATENT DOCUMENTS

| | | |
|---|---|---|
| JP | 2002166122 A * | 6/2002 |
| WO | WO 03/017405 | 2/2003 |
| WO | 2018236649 A1 | 12/2018 |
| WO | WO 2022/087207 | 4/2022 |

OTHER PUBLICATIONS

PCT Application No. PCT/US2021/055957 International Search Report and Written Opinion dated Feb. 14, 2022.

Airbus: "Airbus reveals new zero-emission concept aircraft," Innovation, Sep. 21, 2020, 3 pages. Retrieved from the Internet <https://www.airbus.com/en/newsroom/press-releases/2020-09-airbus-reveals-new-zero-emission-concept-aircraft>.

Airbus: "Hydrogen in aviation: how close is it? Understanding the challenges to widespread hydrogen adoption," Innovation, Oct. 8, 2020, 3 pages. Retrieved from the Internet <https://www.airbus.com/en/newsroom/stories/2020-10-hydrogen-in-aviation-how-close-is-it>.

Airbus: "Hydrogen propulsion to power future aircraft," Innovation, Accessed on Oct. 21, 2021, 3 pages. Retrieved from the Internet <https://www.airbus.com/innovation/zero-emission/hydrogen/zeroe>.

Airbus: "These new Airbus concept aircraft have on thing in common," Innovation, Sep. 21, 2020, 4 pages. Retrieved from the Internet <https://www.airbus.com/en/newsroom/stories/2020-09-these-new-airbus-concept-aircraft-have-one-thing-in-common>.

Spaeth, Andreas, "The hydrogen-powered aircraft takes shape," Deutsche Welle, Sep. 25, 2020, 5 pages. Retrieved from the internet <https://www.dw.com/en/at-airbus-a-hydrogen-powered-aircraft-takes-shape/a-55051579>.

Cohen, Ariel, "Airbus Unveils Designs For Hydrogen-Powered Aircraft Which Could Be Flying By 2035," Forbes, Sep. 23, 2020, 4 pages. Retrieved from the Internet <https://www.forbes.com/sites/arielcohen/2020/09/23/airbus-unveils-designs-for-hydrogen-powered-aircraft-which-could-be-flying-by-2035>.

BBC: "Airbus looks to the future with hydrogen planes," BBC News, Sep. 21, 2020, 11 pages. Retrieved from the Internet <https://www.bbc.com/news/business-54242176>.

Sillers, Paul, "Why this space age airplane could change flying forever," CNN—Call to Earth, Oct. 3, 2020, 4 pages. Retrieved from the Internet <https://www.cnn.com/travel/article/airbus-zero-emissions-concept-plane>.

Potter, Ned, "Airbus Plans Hydrogen-Powered Carbon-Neutral Planes by 2035. Can They Work?" IEEE Spectrum, Oct. 12, 2020, 9 pages. Retrieved from the Internet <https://spectrum.ieee.org/airbus-plans-hydrogenpowered-carbonneutral-planes-by-2035-can-they-work>.

\* cited by examiner

AIRCRAFT ELECTRICAL POWER SUPPLY SYSTEM AND METHOD OF SUPPLYING ELECTRICAL POWER IN AN AIRCRAFT

RELATED APPLICATIONS

This application claims the benefit of priority from U.S. Provisional Application No. 63/104,225, entitled "AIRCRAFT REFUELING USING ELECTROLYSIS" filed on Oct. 22, 2020, the entire contents of which are incorporated herein by reference for all purposes.

TECHNICAL FIELD

An embodiment of the present disclosure is directed to an aircraft electrical power supply system, and more particularly to an aircraft electrical power supply system that includes a fuel cell power unit.

BACKGROUND

An auxiliary power unit (APU) in an aircraft typically consists of a small gas turbine engine mounted in the tail cone of the aircraft. The APU may provide autonomous electrical and mechanical power for starting power for the main engines, pneumatic power for cabin air conditioning systems, shaft power for other pneumatic and hydraulic systems, backup electrical and pneumatic power for in-flight operations and emergencies, and electric and pneumatic power for ground operations with the engines shut down.

Primary electrical power in the aircraft is typically provided by either an alternator or generator. The alternator or generator may be connected to a shaft of an aircraft's engines and use the shaft's rotation to spin magnets mounted within a field coil and thereby produce electricity.

SUMMARY

An aspect of the present disclosure is directed to an aircraft electrical power supply system that includes a fuel cell auxiliary power unit (APU) located on an aircraft and configured to supply auxiliary electrical power to the aircraft, a fuel cell power plant located on the aircraft and configured to supply primary electrical power to the aircraft, and a hydrogen storage unit located on the aircraft and configured to supply hydrogen to the fuel cell APU and the fuel cell power plant.

Another aspect of the present disclosure is directed to a method of supplying electrical power to an aircraft, comprising generating auxiliary electrical power by a fuel cell auxiliary power unit (APU) and supplying the auxiliary electrical power to the aircraft, generating primary electrical power by a fuel cell power plant and supplying the primary electrical power to the aircraft, and storing hydrogen in a hydrogen storage unit and supplying the hydrogen to the fuel cell APU and the fuel cell power plant.

Another aspect of the present disclosure is directed to a method of supplying electrical power to an aircraft, comprising generating hydrogen by water electrolysis, supplying the hydrogen to at least one fuel cell stack located on the aircraft to generate electrical power, and supplying the electrical power to the aircraft.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will be understood that, although the terms first, second, etc. are, in some instances, used herein to describe various elements, these elements should not be limited by these terms. These terms are used only to distinguish one element from another.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context.

An embodiment of the present disclosure may include an aircraft electrical power supply system that may include a fuel cell auxiliary power unit (APU) that may supply auxiliary electrical power to an aircraft, a fuel cell power plant that may supply primary electrical power to the aircraft, and/or an on board fuel storage unit that may supply fuel to the fuel cell APU and the fuel cell power plant. The aircraft electrical power supply system may also include an off board refueling unit that may refuel the aircraft with fuel for the fuel cell APU and fuel cell power plant.

The fuel cell APU and fuel cell power plant may utilize fuel cells to generate electrical power for the aircraft. The fuel cells may include, for example, a proton exchange membrane (PEM) fuel cells (also referred to as polymer electrolyte membrane fuel cells), direct-methanol fuel cells, alkaline fuel cells, phosphoric acid fuel cells, molten carbonate fuel cells or solid oxide fuel cells. The fuel that may be used in the fuel cells may include, for example, hydrogen fuel, a hydrocarbon fuel such as diesel, natural gas, methanol or ethanol, or a chemical hydride fuel.

By utilizing fuel cells, the fuel cell APU may produce auxiliary electrical power more efficiently that a conventional APU (e.g., gas turbine engine APU). The fuel cell power plant may also produce primary electrical power more efficiently that a conventional primary electrical power source (e.g., a motor-generator connected to an engine of the aircraft).

Figure 1A:
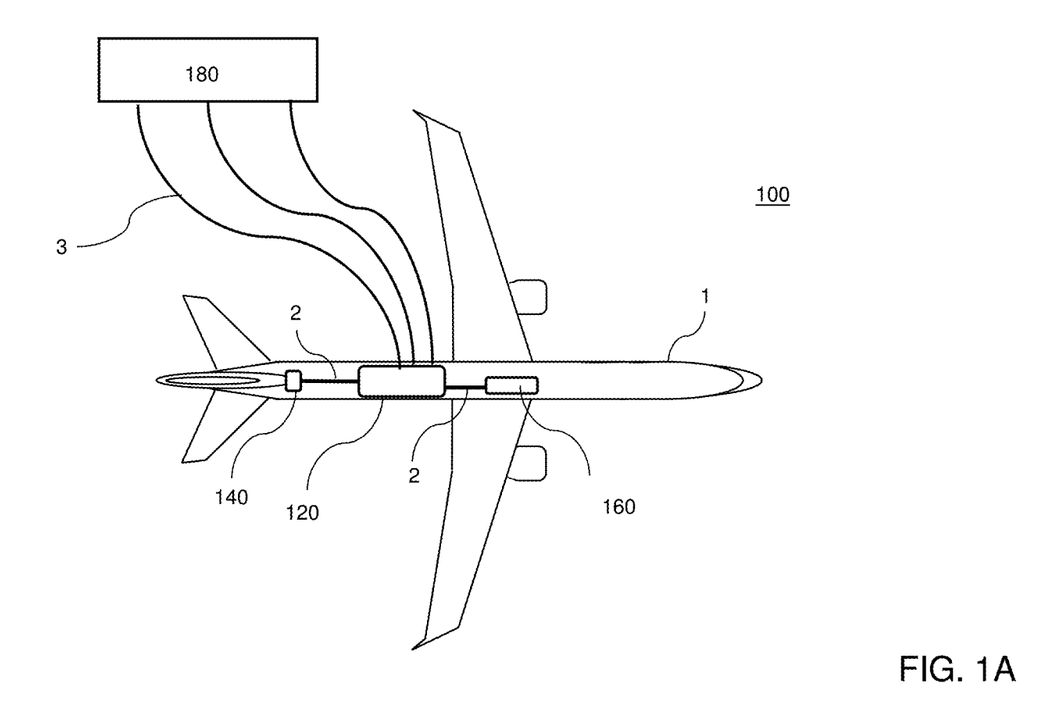
FIG. 1A illustrates a top cut-way view of an aircraft electrical power supply system, according to one or more embodiments of the present disclosure.

FIG. 1A illustrates an overview of an aircraft electrical power supply system 100, according to one or more embodiments of the present disclosure. As illustrated in FIG. 1A, the aircraft electrical power supply system 100 may generate electrical power and supply the generated electrical power to the electrical power distribution system of the aircraft 1.

The aircraft electrical power supply system 100 may include a hydrogen storage unit 120 located inside the aircraft 1. The hydrogen storage unit 120 may comprise a gas storage tank which is configured to store and maintain hydrogen that is used to fuel the fuel cells in the aircraft electrical power supply system 100. The aircraft electrical power supply system 100 may also include a fuel cell auxiliary power unit (APU) 140 inside the aircraft 1 that may supply auxiliary electrical power to the aircraft 1, and/or a fuel cell power plant 160 inside the aircraft that may supply primary electrical power to the aircraft 1. The hydrogen storage unit 120 may supply hydrogen to the fuel cell APU 140 and/or the fuel cell power plant 160 via a hydrogen fuel transmission line 2 on the aircraft 1. It should be noted that the aircraft electrical power supply system 100 is not limited to use in airplanes, but may also be used in other aircraft, such as helicopters and airships, and also reusable spacecraft. Furthermore, while a jet aircraft 1 is schematically illustrated in FIG. 1A, a smaller propeller powered aircraft 1 may be used.

The aircraft electrical power supply system 100 may also include an off board hydrogen refueling unit 180 that may refuel the aircraft 1 with hydrogen. The aircraft electrical power supply system 100 may use one or more transfer hoses 3 for transferring hydrogen and/or other gases and liquids on and off of the aircraft 1. During a refueling operation, for example, one or more storage vessels (e.g., tanks) storing liquids and/or gases (e.g., hydrogen, oxygen, nitrogen, etc.) in the off board hydrogen refueling unit 180 may be coupled to storage vessel(s) (e.g., tank(s)) on board the aircraft 1 (e.g., in the hydrogen storage unit 120) by the transfer hoses 3.

The off board hydrogen refueling unit 180 may be located, for example, at an airport. In that case, for example, a refueling operation may be performed by the off board hydrogen refueling unit 180 between flights of the aircraft 1. Alternatively, the off board hydrogen refueling unit 180 may be a mobile unit that may be located, for example, on a refueling truck or a refueling aircraft. For example, when located on a refueling aircraft, the off board hydrogen refueling unit 180 may perform the refueling operation while the aircraft 1 is in flight.

The fuel cell APU 140 may utilize one or more fuel cells in a first fuel cell stack to generate auxiliary electrical power in the aircraft 1. The fuel cell power plant 160 may utilize one or more fuel cells in a second fuel cell stack to generate primary electrical power in the aircraft 1.

Figure 1B:
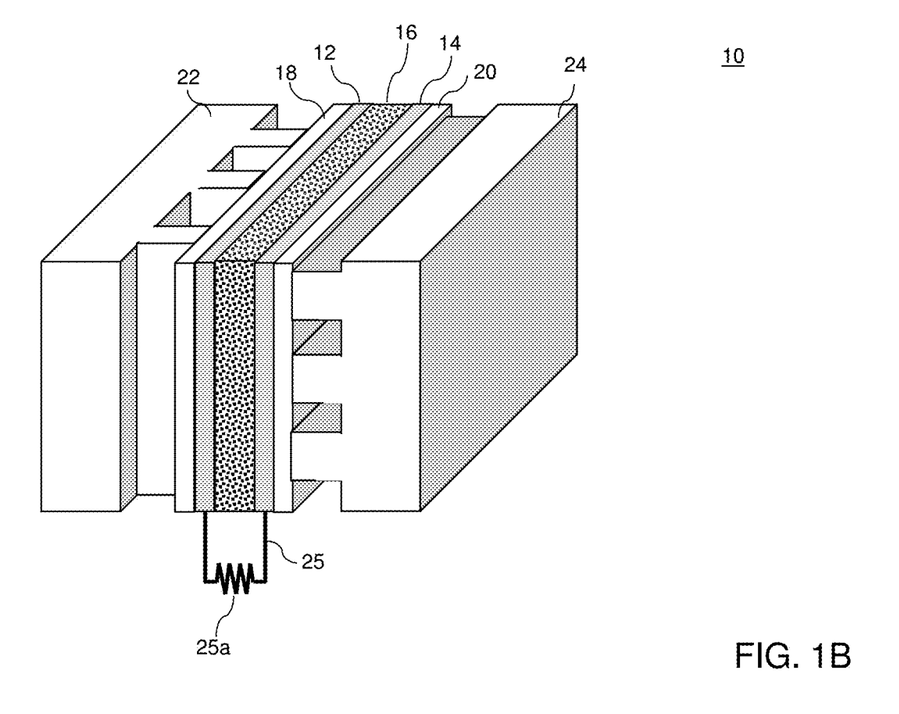
FIG. 1B illustrates a perspective view of a fuel cell that may be utilized in the aircraft electrical power supply system, according to one or more embodiments.

FIG. 1B illustrates a fuel cell 10 that may be utilized in the aircraft electrical power supply system 100, according to one or more embodiments. The fuel cell 10 may include, for example, a PEM fuel cell. The fuel cell 10 may include an anode 12 and cathode 14 on opposing sides of a polymer electrolyte membrane 16. An anode-side backing layer (e.g., gas diffusion layer) 18 may be disposed on the anode 12, and a cathode side backing layer (e.g., gas diffusion layer) 20 may be disposed on the cathode 14. A fuel flow field 22 may be disposed on the anode-side backing layer 18, and an oxidant flow field 24 may be disposed on the cathode side flow field 20.

In operation, wherein hydrogen is used as the fuel and air (e.g., oxygen) is used as the oxidant, hydrogen may be caused to flow through flow plates of the hydrogen flow field 22 to the anode 12, and air may be caused to flow through flow plates of the oxidant flow field 24 to the cathode 14. The anode 12 may include a catalyst (e.g., platinum catalyst) that causes the hydrogen to split into positive hydrogen ions (protons) and negatively charged electrons. The polymer electrolyte membrane 18 may allow only the positively charged ions to pass through it to the cathode 14. The negatively charged electrons may travel along a circuit 25 that is external to the cathode 14 creating an electrical current that may power a load 25a. At the cathode 14, the electrons and hydrogen ions may combine with oxygen in the air to form water that flows out of the fuel cell 10.

A plurality (e.g., tens or hundreds) of the fuel cells 10 may be connected together (e.g., in series) to form a fuel cell stack. In the aircraft 1, the fuel cell APU 140 and the fuel cell power plant 160 may each include one or more fuel cell stacks that may generate electrical power sufficient to power all of the electrical devices on the aircraft 1.

Figure 2:
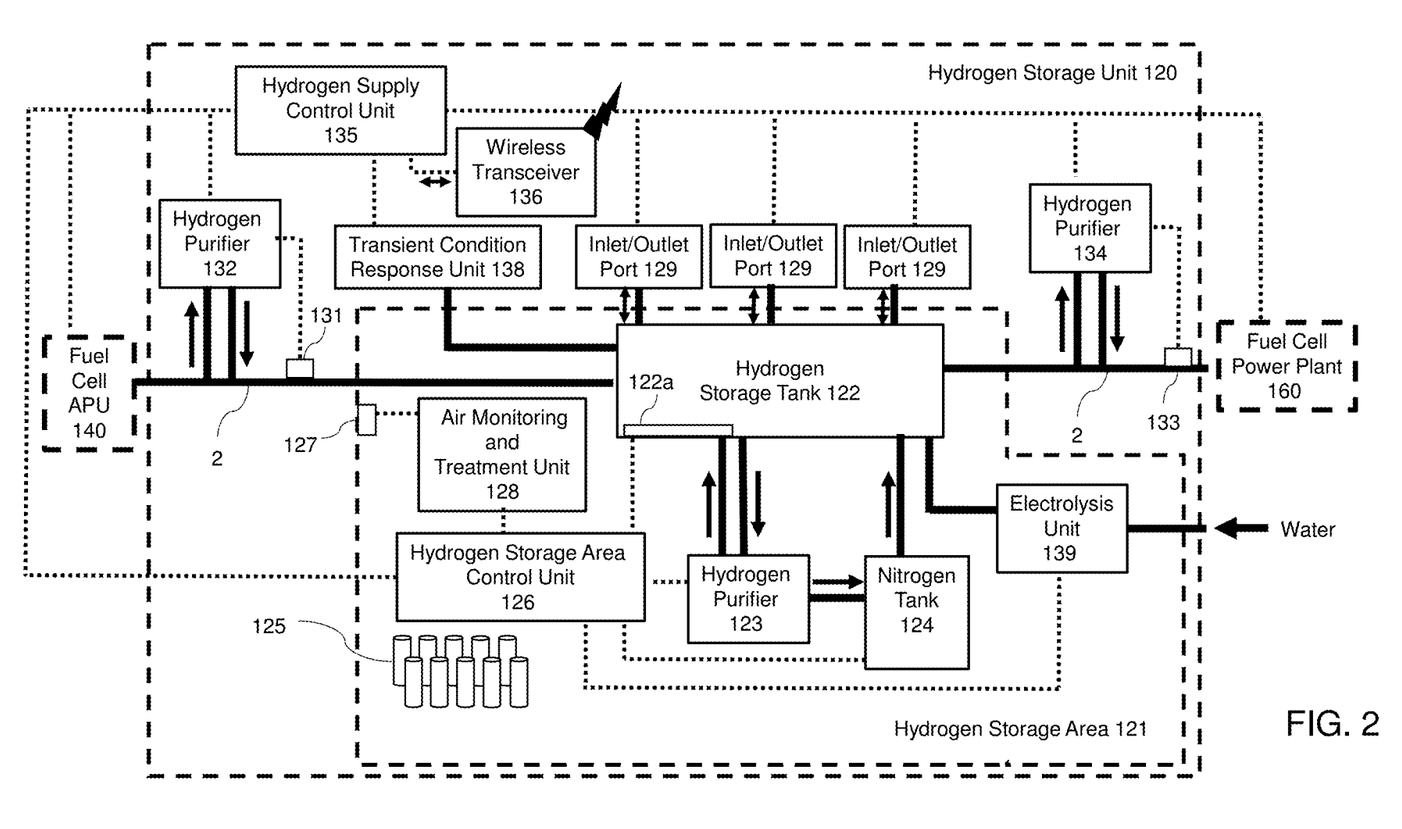
FIG. 2 illustrates a diagram of the hydrogen storage unit, according to one or more embodiments.

FIG. 2 illustrates the hydrogen storage unit 120, according to one or more embodiments. The hydrogen storage unit 120 may store and maintain hydrogen that may be used to fuel the fuel stacks in the fuel cell APU 140 and/or the fuel cell power plant 160.

The hydrogen storage unit 120 may include a hydrogen storage area 121. The hydrogen storage area 121 may include one or more hydrogen storage tanks 122 for storing hydrogen, a hydrogen purifier 123 for purifying the hydrogen stored in the hydrogen storage tank 122, and a nitrogen tank 124 that may store nitrogen that has been extracted from the hydrogen by the hydrogen purifier 123. The nitrogen tank 124 may also be coupled to the hydrogen storage tank 122, and under certain circumstances, nitrogen from the nitrogen tank 124 may be used to dilute the hydrogen in the hydrogen storage tank 122. One or more hydrogen-filled cannisters 125 may also be stored in the hydrogen storage area 121. The hydrogen-filled cannisters 125 may be used to supply hydrogen on the aircraft 1 in place of or in supplement to the hydrogen stored in the hydrogen storage tank 122.

The hydrogen purifier 123 may include an electrochemical pump or cascade of electrochemical pumping stages that continuously purify the hydrogen stored in the hydrogen storage tank 122. This may be particularly useful in the case that off-gassing (e.g., in the hydrogen storage tank 122) creates impurities in the hydrogen stored therein.

One or more sensors 122a may be disposed in or on the hydrogen storage tank 122. The sensors 122a may include gas composition sensors which detect conditions inside the hydrogen storage tank 122 such as a concentration of various gases such as hydrogen and nitrogen, and may also detect impurities in the hydrogen. The sensors 122a may also include temperature and/or pressure sensors which detect temperature and/or pressure in the hydrogen storage tank 122.

The hydrogen storage area 121 may also include a hydrogen storage area control unit 126 that may be electrically coupled to the sensors 122a, the hydrogen purifier 123 and the nitrogen tank 124. The hydrogen storage area control unit 126 may control an operation of the hydrogen storage tank 122, hydrogen purifier 123 and nitrogen tank 124 based on data supplied by the sensors 122a. In particular, the hydrogen storage area control unit 126 may control opening and closing of valves for transmitting gases to and from the hydrogen storage tank 122, hydrogen purifier 123 and nitrogen tank 124.

The sensors 122a may indicate when a combustible mixture is included in the hydrogen storage tank 122, and thus may indicate a "hazard" condition. When the hydrogen storage tank 122 does not contain hydrogen or other fuels in a "hazard" condition (e.g., when the hydrogen storage tank 122 is backfilled with an inert gas such as nitrogen, argon or helium), then the hydrogen storage tank 122 may be indicated to be in a "safe" condition. In particular, the sensors 122a may detect a dangerous hydrogen condition, and may be arranged in a coincidence logic arrangement such that, for example, a certain percentage of the sensors 122a (e.g., ¾ of the sensors 122a) must indicate "safe" to prove safe, a certain percentage of the sensors 122a (e.g., ⅔ of the sensors 122a) must indicate "danger" to prove danger, etc.

The sensors 122a (e.g., low level sensors) may also notify the hydrogen storage area control unit 126 when a condition in the hydrogen storage tank 122 (e.g., hydrogen purity) is at a boundary of safe operation. The hydrogen storage area control unit 126 may then pass this information on to the hydrogen supply control unit 135 which may then notify the fuel cell APU 140 and fuel cell power plant 160 of the condition.

The hydrogen storage area control unit 126 may include a processing device (e.g., processor, central processing unit (CPU)) for executing instructions to cause an operation (e.g., opening valves, closing valves, etc.) to be performed in the hydrogen storage area 121. The hydrogen storage area control unit 126 may also include a memory device (random access memory (RAM), read only memory (ROM), etc.) for storing instructions to be executed by the processor. The memory device may also store other data such as history data (e.g., hydrogen concentration, temperature, pressure, etc.) collected by the sensors 122a. The processor may access the data in the memory device and perform operations on the data, utilize the data in executing instructions, etc.

One or more additional sensors 127 may be located in the hydrogen storage area 121. The sensors 127 may detect conditions inside the hydrogen storage area 121 such as temperature, pressure and humidity. The sensors 127 may also detect a level of hydrogen, oxygen and other gases in the ambient air inside the hydrogen storage area 121. The hydrogen storage area 121 may also include an air monitoring and treatment unit 128 that may receive data from the sensor 127, and may use the data to treat the air inside the hydrogen storage area 121. The air monitoring and treatment unit 128 may include, for example, a heating and cooling unit, humidifier, dehumidifier, etc. The hydrogen storage area control unit 126 may control the air monitoring and treatment unit 128.

In particular, the sensors 127 may include hydrogen sensors that may detect an amount of hydrogen in the ambient air in the hydrogen storage area 121. The sensors 127 may, therefore, detect a hydrogen leak in the hydrogen storage area 121 that may cause the air monitoring and treatment unit 128 to set off an alarm (e.g., visual alarm, audible alarm, etc.) if the level of hydrogen in the ambient air is above a lower limit (e.g., a potential flammability level).

The hydrogen storage area control unit 126 may also control the air monitoring and treatment unit 128 to ventilate the hydrogen storage area 121 at a negative pressure, and/or to remove oxygen from the ambient air in the hydrogen storage area 121. The hydrogen storage area control unit 126 may also control an opening/closing of an outlet valve on the nitrogen tank 124 in order to release nitrogen from the nitrogen tank 124 into the hydrogen storage area 121.

The hydrogen storage area 121 may also include an electrolysis unit 139 that is connected to the connected to aircraft's power supply and supplied with water from the aircraft's water supply. The electrolysis unit 139 may produce hydrogen under the control of the hydrogen storage area control unit 126. In particular, the electrolysis unit 139 may be directed to produce hydrogen in the event that the sensor 122a detect a low level of hydrogen in the hydrogen storage tank 122.

The hydrogen storage unit 120 may also include a plurality of inlet/outlet ports 129 (e.g., inlet ports and/or outlet ports) that may be coupled to the hydrogen storage tank 122. In a refueling operation, the transfer hoses 3 (see FIG. 1) may be connected to the inlet/outlet ports 129 in order to transfer gases between hydrogen storage tank 122 and the off board hydrogen refueling unit 180. For example, the inlet/outlet ports 129 may be used to transfer hydrogen from the off board hydrogen refueling unit 180 into the hydrogen storage tank 122. This inlet/outlet ports 129 may also be used to transfer hydrogen from the hydrogen storage tank 122 to one or more storage tanks in the off board hydrogen refueling unit 180. This may be done, for example, to empty the hydrogen storage tank 122 or to have the hydrogen reprocessed by the off board hydrogen refueling unit 180. The inlet/outlet ports 129 may also be used to be used transfer nitrogen (e.g., backfill nitrogen) into the hydrogen storage tank 122 during a refueling operation as a safety precaution.

The inlet/outlet ports 129 may also be connected, for example, to an emergency buoyancy system in order to rapidly fill a safety balloon with hydrogen. The inlet/outlet ports 129 may also be connected to a hydrogen dumping port in the aircraft 1 in order to rapidly empty the hydrogen storage tank 122.

The hydrogen storage unit 120 may also include a sensor 131 that may be formed in a part of the hydrogen fuel transmission line 2 that supplies hydrogen from the hydrogen storage tank 122 to the fuel cell APU 140. The sensor 131 may be a gas composition sensor configured to detect a purity of the hydrogen in that part of the hydrogen fuel transmission line 2. The hydrogen storage unit 120 may also include a hydrogen purifier 132 that is formed in that part of the hydrogen fuel transmission line 2 and may purify the hydrogen there based on data (e.g., purity data) from the sensor 131.

The hydrogen storage unit 120 may also include a sensor 133 that may be formed in a part of the hydrogen fuel transmission line 2 that supplies hydrogen from the hydrogen storage tank 122 to the fuel cell power plant 160. The sensor 133 may be a gas composition sensor configured to detect a purity of the hydrogen in that part of the hydrogen fuel transmission line 2. The hydrogen storage unit 120 may also include a hydrogen purifier 134 that is formed in that part of the hydrogen fuel transmission line 2 and may purify the hydrogen there based on data (e.g., purity data) from the sensor 133.

The hydrogen storage unit 120 may also include a hydrogen supply control unit 135 for controlling an operation in the hydrogen storage unit 120. The hydrogen supply control unit 135 may include a processing device (e.g., processor, central processing unit (CPU)) for executing instructions to cause an operation (e.g., opening valves, closing valves, etc.) to be performed in the hydrogen storage unit 120. The hydrogen supply control unit 135 may also include a memory device (random access memory (RAM), read only memory (ROM), etc.) for storing instructions to be executed by the processor. The memory device may also store other data such as history data (e.g., hydrogen concentration, temperature, pressure, etc.) collected by the various sensors in the hydrogen storage unit 120. The processor may access the data in the memory device and perform operations on the data, utilize the data in executing instructions, etc.

The hydrogen supply control unit 135 may be communicatively coupled (e.g., by wire or wireless) to the hydrogen purifier 132 and the hydrogen purifier 134. The hydrogen supply control unit 135 may thereby control a purifying operation in the hydrogen purifier 132 and the hydrogen purifier 134. The hydrogen supply control unit 135 may also be communicatively coupled (e.g., by wire or wireless) to the inlet/outlet ports 129 and may thereby control a transfer of hydrogen, nitrogen or other gases to and from the hydrogen storage tank 122. The hydrogen supply control unit 135 may also be communicatively coupled (e.g., by wire or wireless) to the hydrogen storage area control unit 126 to facilitate an exchange of information (e.g., history data, software updates, etc.) between the hydrogen supply control unit and the hydrogen storage area control unit 126.

The hydrogen supply control unit 135 may also be communicatively coupled (e.g., by wire or wireless) to the fuel cell APU 140 and the fuel cell power plant 160 in order or coordinate a supplying of hydrogen (e.g., increasing/decreasing flow rates, supply timing, hydrogen purity requirements, etc.) to the fuel cell APU 140 and the fuel cell power plant 160. The hydrogen supply control unit 135 may also be communicatively coupled (e.g., by wire or wireless) to various flowmeters, actuators and valves (e.g., ball valves, butterfly valves, etc.) that may be formed in the hydrogen fuel transmission line 2. The hydrogen supply control unit 135 may thereby further control a supplying of hydrogen to the fuel cell APU 140 and to the fuel cell power plant 160.

The hydrogen storage unit 120 may also include a wireless transceiver 136 that is connected to the hydrogen supply control unit 135. The wireless transceiver 136 may communicate wirelessly with the off board hydrogen refueling unit 180 and facilitate wireless communication between the hydrogen supply control unit 135 and the off board hydrogen refueling unit 180. The hydrogen supply control unit 135 may thereby coordinate an operation (e.g., hydrogen refueling operation, hydrogen reprocessing operation, etc.) and exchange information about the operation (e.g., time, date, quantity, hydrogen purity level, etc.) with the off board hydrogen refueling unit 180.

Further, hydrogen may be stored in the hydrogen storage tank 122 as a gas mixture of hydrogen and inert gas (e.g., nitrogen, argon) such that the concentration in the hydrogen storage tank 122 is below the upper explosive limit for hydrogen. For example a forming gas mixture of nitrogen and a low percentage of hydrogen (e.g., less than 20 volume percent, such as 1-4 volume percent) may be stored. Later, when this gas mixture is supplied from the hydrogen storage tank 122 to a fuel cell stack in the fuel cell APU 140 and/or the fuel cell power plant 160, a purifying recirculation such as via electrochemical pumping may be used in the anode loop of the fuel cell stack to remove the inert gas in the gas mixture. The inert gas that is removed from the gas mixture may be saved on board via a compressor. In addition, multiple stages of purifying recirculation may be used.

The sensor 122a may perform a sensing operation in the hydrogen storage tank 122 based on a reference gas that may be generated in situ. For example, the reference gas may be generated by the hydrogen purifier 123 that may include, for example, a hydrogen pumping element. A sensing operation performed, for example, by the sensor 122a or sensor 127, can be potentiometric or amperometric. The actual type of sensing operation to be used may depend on the electrochemical activity of an impurity that is to be detected. If the impurity is inert or adsorbing, then the sensing operation may be potentiometric. If the impurity is electrochemically active, then the sensing operation may refer to that potential and record the current draw. Regardless of the type of sensing operation used, if the impurity concentration is very low, then a multistage hydrogen pumping operation (e.g., by the hydrogen purifier 123) may be performed in order to increase the sensitivity of the sensor. The hydrogen storage unit may also include a transient condition response unit 138. In the condition of landing while the aircraft 1 still contains a large amount of hydrogen on board (e.g., in the hydrogen storage tank 122) the hydrogen supply control unit 135 may direct the transient condition response unit 138 to take a precautionary action with respect to the stored hydrogen. The precautionary action may include diluting the hydrogen (e.g., with nitrogen from the nitrogen tank 124) and/or dumping the hydrogen from a wing of the aircraft 1 or from another trailing surface such as the tail of the aircraft 1. For example, in the condition of landing the aircraft 1 when there is not time to dump the hydrogen, the transient condition response unit 138 may cause nitrogen (or another inert gas such as argon or helium) to be rapidly mixed with the stored hydrogen. This may help to ensure that the aircraft 1 can perform a hydrogen fuel dumping operation without creating a combustible hydrogen/oxygen mixture (e.g., a mixture where hydrogen is less than 4% or greater than 80%).

The transient response control unit 138 may be connected to the hydrogen storage tank 122, and may be composed of various valves, pumps and piping necessary to perform the response (e.g., diluting and/or dumping hydrogen). The precautionary action may also include, in the condition of catastrophic failure of the main propulsion system, transferring the stored hydrogen to an emergency buoyancy system. The emergency buoyancy system may include, for example, a balloon made of Kevlar or other high strength material that, when filled with hydrogen, may to provide capability for controlled descent of the aircraft 1.

Figure 3:
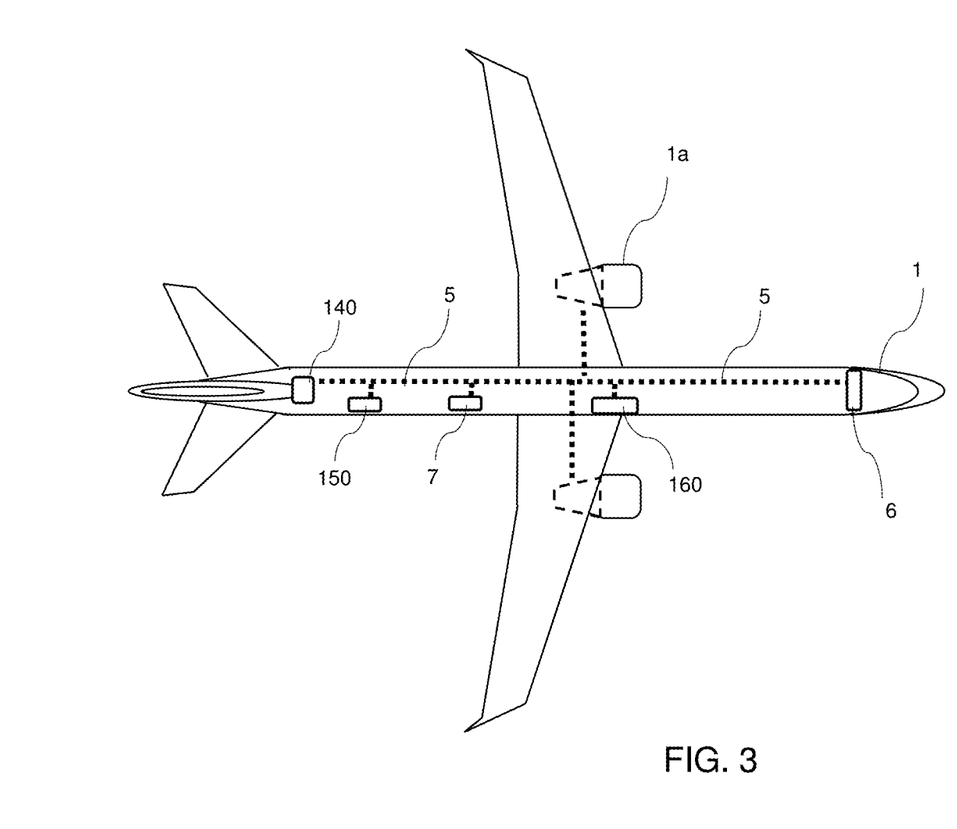
FIG. 3 illustrates a top cut-way view of the electrical power distribution system in the aircraft, according to one or more embodiments.

FIG. 3 illustrates the electrical power distribution system 5 in the aircraft 1, according to one or more embodiments. The electrical power distribution system 5 may include electrical transmission wires and cables and electrical devices (e.g., inverters) that are used to distribute electrical power to the various electrical/electronic devices on the aircraft 1. The electrical power distribution system 5 may be connected, for example, to the aircraft's gas turbine engines 1a (or to one or more propellers in a propeller powered aircraft), the forward electrical/electronics (E/E) equipment bay 6 and the aft E/E equipment bay 7. The fuel cell APU 140 and the fuel cell power plant 160 may be connected to the electrical power distribution system 5 in order to power the aircraft's electrical/electronic devices (e.g., onboard lighting, galley electronics and cockpit avionics). A backup power supply 150 that may include, for example, a secondary battery (e.g., lithium ion battery) may also be connected to the electrical power distribution system 5.

Figure 4:
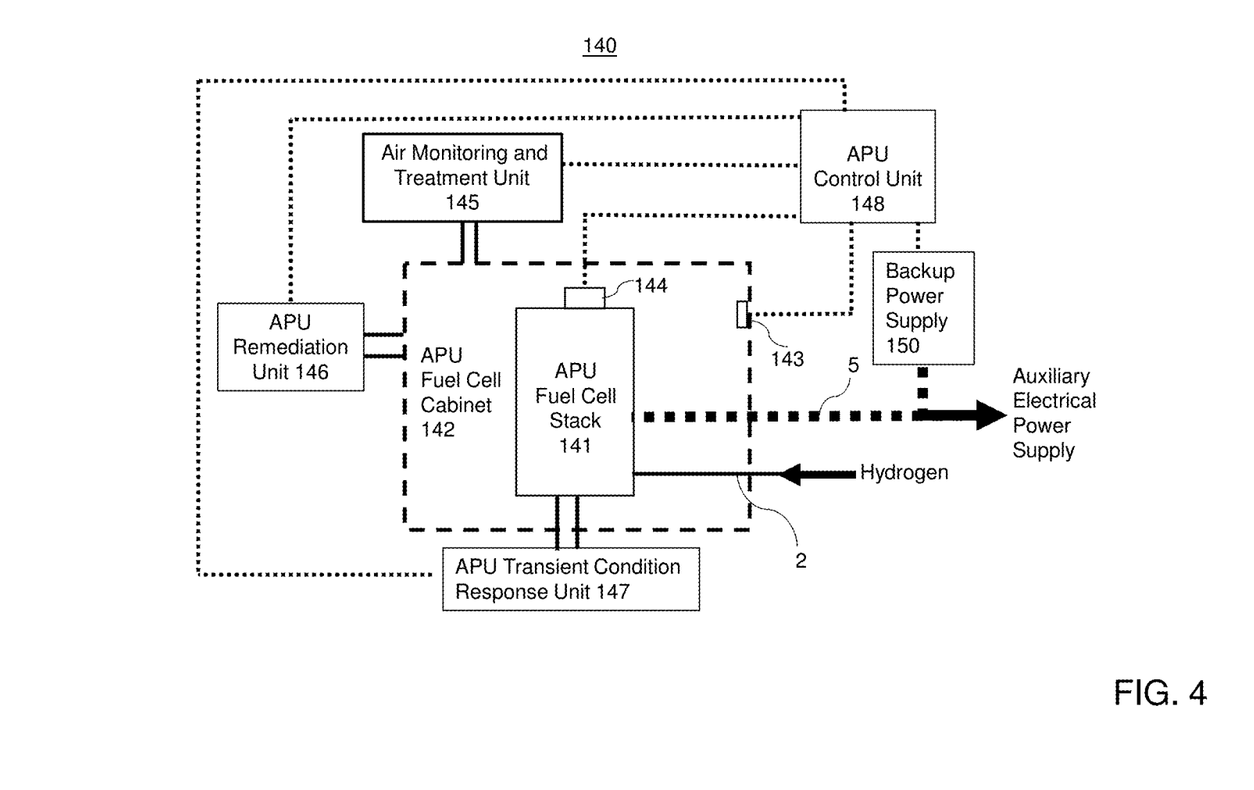
FIG. 4 illustrates a diagram of the fuel cell APU, according to one or more embodiments.

FIG. 4 illustrates the fuel cell APU 140, according to one or more embodiments. The fuel cell APU 140 may generate auxiliary electrical power for use in the aircraft 1, which may be distributed by the aircraft's electrical power distribution system 5. The auxiliary electrical power generated by the fuel cell APU 140 may be used, for example, to start one or more of the engines (e.g., gas turbine engines 1a or propeller engines) on the aircraft 1. The auxiliary electrical power may also be used to power onboard lighting, galley electronics and cockpit avionics, such as while the aircraft 1 is on the ground. The fuel cell APU 140 may also be communicatively coupled to the aircraft's backup power supply 150.

As illustrated in FIG. 4, the fuel cell APU 140 may include one or more APU fuel cell stacks 141 that each may include a plurality of fuel cells (e.g., PEM fuel cells). The APU fuel cell stacks 141 may be located in an APU fuel cell cabinet 142 that may include tightly monitored ambient conditions (e.g., temperature, humidity). The APU fuel cell cabinet 142 may include one or more sensors 143 (e.g., infrared cameras) for monitoring the conditions in the APU fuel cell cabinet 142. An air monitoring and treatment unit 145 may be connected to the APU fuel cell cabinet 142 and may treat the air inside the APU fuel cell cabinet 142 based on data from the sensors 143.

The fuel cell APU 140 may be supplied with hydrogen from the hydrogen storage unit 120 via the hydrogen fuel transmission line 2. One or more sensors 144 may be connected to the APU fuel cell stack 141. The sensors 144 may comprise pressure and/or temperature sensors configured to detect a condition (e.g., temperature, pressure, etc.) in the APU fuel cell stack 141. The sensors 144 may also include, for example, a voltage probe and/or a current sensor, which measures voltage or current output by the APU fuel cell stack 141.

The fuel cell APU 140 may also include an APU remediation unit 146 that may remedy an undesirable condition in the APU fuel cell cabinet 142. The APU remediation unit 146 may provide emergency humidification to the APU fuel cell cabinet 142, purge the air in the APU fuel cell cabinet 142, and supply emergency hydrogen and/or oxygen to the APU fuel cell cabinet 142. Thus, the APU remediation unit 146 may include a water or water vapor source, a blower and/or fan, and one or more gas (e.g., hydrogen and/or oxygen) tanks and/or pipes.

The fuel cell APU 140 may also include an APU transient condition response unit 147. The APU transient condition response unit 147 may respond to a condition (e.g., an undesirable condition) in the APU fuel cell stack 141. In particular, the APU transient condition response unit 147 may inject compressed air into the cathode side of the APU fuel cell stack 141, or may heat or cool the APU fuel cell stack 141 as needed to improve a performance of the APU fuel cell stack 141. APU transient condition response unit 147 may include an air blower or fan that provides cool or warm air to the APU fuel cell stack 141.

The fuel cell APU 140 may also include an APU control unit 148 that may control an operation of the fuel cell APU 140. The APU control unit 148 may be communicatively coupled (e.g., by wire or wireless) to and thereby control an operation of the sensors 143, sensors 144, air monitoring and treatment unit 145, APU remediation unit 146, APU transient condition response unit 147 and the backup power supply 150.

The APU control unit 148 may include a processing device (e.g., processor, central processing unit (CPU)) for executing instructions to cause an operation (e.g., remediation operation, transient condition response, etc.) to be performed in the fuel cell APU. The APU control unit 148 may also include a memory device (random access memory (RAM), read only memory (ROM), etc.) for storing instructions to be executed by the processor. The memory device may also store other data such as history data and performance data (e.g., hydrogen concentration, temperature, pressure, etc.) collected by the sensors 143 and 144. The processor may access the data in the memory device and perform operations on the data, utilize the data in executing instructions, etc.

The fuel cell APU 140 may provide auxiliary electrical power to one or more of the gas turbine engines 1a of the aircraft 1. The gas turbine engines 1a may have a configuration so as to accommodate the use of the fuel cell APU 140. For example, the gas turbine engines 1a may include sensors and detectors (e.g., "fire eye" wave-length fire detectors) that may detect a hydrogen-air fire inside the aircraft 1, the fuel cell APU 140, the fuel cell power plant 140, and/or in the gas turbine engine 1a itself.

The fuel cell APU 140 may be higher in efficiency than conventional APUs, such as turbine based APUs. The fuel cell APU 140 may be sized sufficiently to provide power to a motor-generator that is mounted on a shaft of the gas turbine engine 1a. The motor-generator may normally be used to provide electrical power to the aircraft power, but in an emergency condition, the fuel cell APU may motor the motor-generator to provide some additional thrust to the aircraft 1.

In addition, the auxiliary electrical power generated by the fuel cell APU 140 and supplied to the motor-generator of the gas turbine engines 1a may be used for thrust reversal during a landing of the aircraft 1. The motor-generator generated power from one of the gas turbines 1a may be used to power as a motor another one of the gas turbines 1a in the event of a casualty condition.

The fuel cell APU 140 may be designed for extremely rapid start/stop operation as needed for casualty power. The fuel cell APU 140 may also have a modular design such that failure of a single fuel cell stack in a plurality of APU fuel cell stacks 141 may not necessarily create a failure of the entire fuel cell APU 140. For example, the power electronics of the fuel cell APU 140 may create individually DC wired circuits from stack elements of the APU fuel cell stack 141 to power electronic devices on the aircraft 1.

Figure 5:
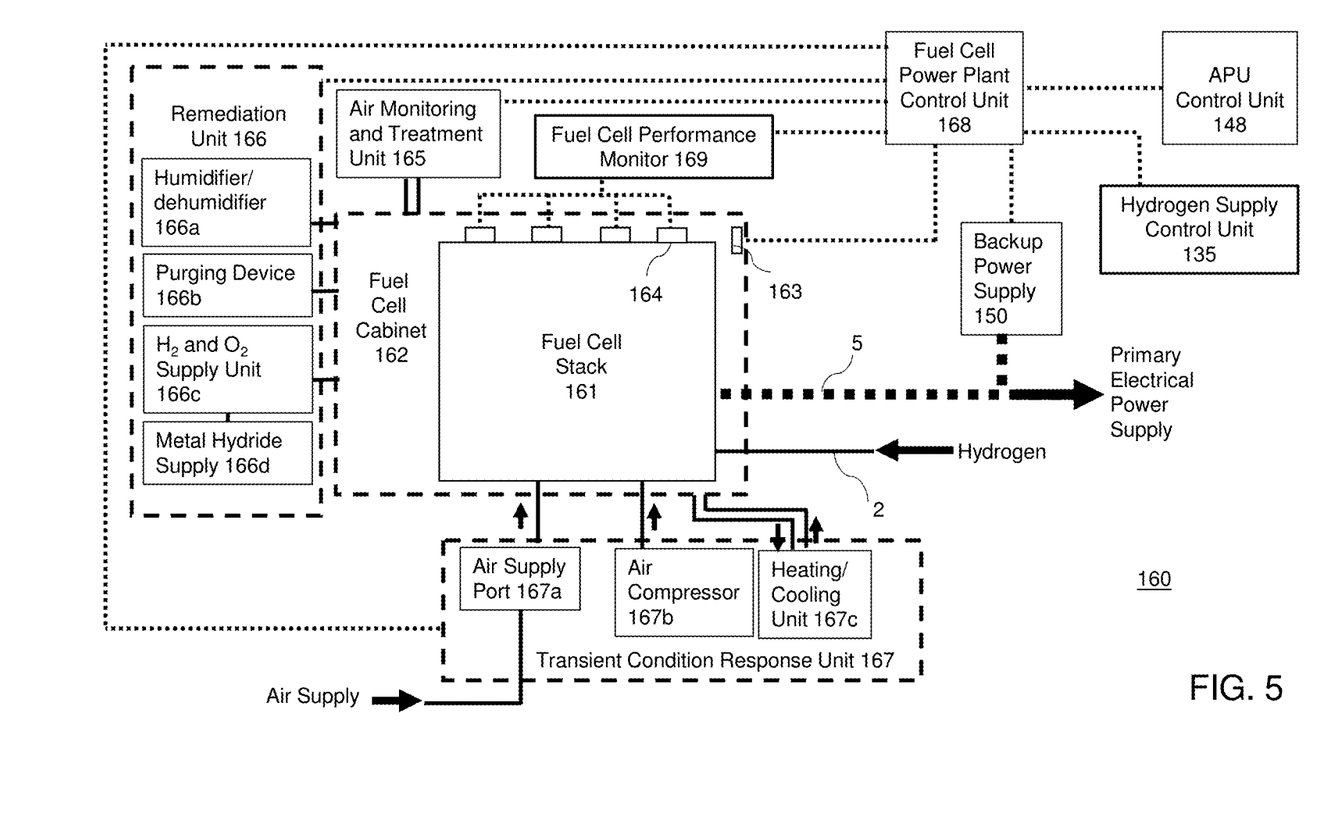
FIG. 5 illustrates a diagram the fuel cell power plant, according to one or more embodiments.

FIG. 5 illustrates the fuel cell power plant 160, according to one or more embodiments. The fuel cell power plant 160 may generate primary electrical power for use in the aircraft 1 which may be distributed by the aircraft's electrical power distribution system 5. The fuel cell power plant 160 may be used to power devices, for example, in the forward electrical/electronics (E/E) equipment bay 6 and the aft E/E equipment bay 7. In particular, the fuel cell power plant 160 may power onboard lighting, galley electronics and cockpit avionics, such as while the aircraft 1 is in flight. The fuel cell power plant 160 may also be communicatively coupled to the aircraft's backup power supply 150.

As illustrated in FIG. 5, the fuel cell power plant 160 may include one or more fuel cell stacks 161 that each may include a plurality of fuel cells (e.g., PEM fuel cells). The fuel cell stacks 161 may be located in a fuel cell cabinet 162 that may include tightly monitored ambient conditions (e.g., temperature, humidity). The fuel cell cabinet 162 may include one or more sensors 163 (e.g., temperature sensor, humidity sensor, one or more infrared cameras, etc.) for monitoring the conditions in the fuel cell cabinet 162. An air monitoring and treatment unit 165 may be connected to the fuel cell cabinet 162 and may treat the air inside the fuel cell cabinet 162 based on data from the sensors 163. The air monitoring and treatment unit 165 may comprise at least one pump, blower or fan which may evacuate the fuel cell cabinet and/or provide air into the fuel cell cabinet 162. Water generated in the fuel cell stack 161 (as well as the APU fuel cell stack 141) may be used as water for utilities on the aircraft 1, or as water for the electrolysis unit 139 (see FIG. 2) on board the aircraft 1.

In one embodiment, the fuel cell cabinet 162 may include, for example, an air-tight chamber. The air monitoring and treatment unit 165 may include a vacuum device (e.g., vacuum pump or blower) for maintaining the fuel cell cabinet 162 at a negative pressure relative to the outside. The sensors 163 may include hydrogen sensors for detecting leaks above a lower flammability level. The sensors 163 may also include one or more infrared (IR) cameras (e.g., IR-based thermal cameras) for detecting local hot spots in the fuel cell cabinet 162 (e.g., in the fuel cell stack 161).

The fuel cell power plant 160 may be supplied with hydrogen from the hydrogen storage unit 120 via the hydrogen fuel transmission line 2. One or more sensors 164 may be connected to the fuel cell stack 161. The sensors 164 may comprise temperature and/or pressure sensors configured to detect a condition (e.g., temperature, pressure, etc.) in the fuel cell stack 161. The sensors 164 may also include voltage probes that are placed at various points in the fuel cell stack 161. Data from the voltage probes may be used by the fuel cell power plant control unit 168 to determine the distribution of reactants in the fuel cell stack and output voltage of the fuel cell stack 161 using DC voltage measurements and/or AC impedance spectroscopy (i.e., electrochemical impedance spectroscopy (EIS)) performed by an EIS analyzer.

The fuel cell power plant 160 may also have a fuel cell performance monitor 169 that receives data from the sensors 164 to monitor a performance of the fuel cell stack 161. The fuel cell performance monitor 169 may perform electrochemical impedance spectroscopy to determine the various losses (e.g., ohmic vs. activation vs. mass transport) in the fuel cell stack 161. The fuel cell performance monitor 169 may determine a recommended action based on the results of the spectroscopy, and the fuel cell power plant control unit 168 may control the various elements of the fuel cell power plant 160 in order to take the recommended action.

The fuel cell performance monitor 169 may be designed to enable AC impedance measurements by injecting an AC impedance ripple into the fuel cell stack 161. The ripple may be applied continuously or applied periodically (e.g., as required) to ensure proper operation of the fuel cell stack 161. In particular, the AC impedance spectroscopy may include a low frequency ripple to monitor for issues (e.g., alarming conditions) such as water management issues in the fuel cell power plant 160. The AC impedance spectroscopy may also include a 1 kHz frequency ripple to monitor for dry out conditions of a humidified fuel cell power plant 160. Further, in conducting AC impedance spectroscopy, the fuel cell performance monitor 169 may perform tests, such as a) ripple injection and analysis by fast Fourier transform of cell voltage to calculate impedance as may be performed without interrupting load to or from electrochemical cells; or b) current interrupt and cell monitoring decay, or c) a combination of these two tests.

The fuel cell performance monitor 169 may also be able to conduct AC impedance spectroscopy on electrochemical batteries (e.g., lithium ion batteries) on the aircraft 1. Such batteries may be included, for example, in the backup power supply 150. The fuel cell performance monitor 169 may thereby detect a hazardous condition (e.g., fire hazard) in a battery and notify the fuel cell power plant control unit 168 to remove current from the battery.

The fuel cell power plant 160 may also include a remediation unit 166 that may remedy an undesirable condition in the fuel cell cabinet 162. The remediation unit 166 may remedy conditions (e.g., improper conditions) that are detected by the fuel cell performance monitor 169, for example, by AC impedance spectroscopy, voltage analysis, or a combination of both.

The remediation unit 166 may include a humidifier/dehumidifier 166a that may provide emergency humidification and/or dehumidification to the fuel cell cabinet 162. The humidifier/dehumidifier 166a may provide emergency humidification to restore an operation of the fuel cell stack 161 in the case of a loss of humidification or dry out to restore proper voltage-current operation of the fuel cell stack 161. The remediation unit 166 may also include a purging device 166b that may rapidly purge the air in the fuel cell cabinet 162. The purging device 166b may include, for example, a vacuum pump or blower and/or an evacuated vacuum chamber that may be used to clear a "flooding" of the fuel cell stack 161 if water management issues are detected to restore proper voltage-current operation of the fuel cell stack 161.

The remediation unit 166 may also include a hydrogen and oxygen supply unit 166c that may provide a hydrogen supply and/or oxygen supply (e.g., emergency hydrogen and/or oxygen) to the fuel cell cabinet 162. The hydrogen and oxygen supply unit 166c may provide emergency hydrogen and oxygen that may be contained for use in the case of starvation of anode or cathode reactants as triggered by AC impedance and voltage monitoring by the fuel cell performance monitor 169. For example, in the case of cathode starvation, the hydrogen and oxygen supply unit 166c may boost the oxygen supply, and in the case of anode starvation, the hydrogen and oxygen supply unit 166c may boost the hydrogen supply.

The remediation unit 166 may include a metal hydride supply 166d that can provide emergency hydrogen via metal hydride. The metal hydride supply 166d may comprise a metal gas storage material located in a gas tank. The metal gas storage material may comprise any metal (e.g., magnesium, palladium, lithium or alloys of aluminum or transition metal (e.g., Ni, Co, Mn, Fe, etc.), with a rare-earth, alkaline earth metals or another transition metal) which forms a metal hydride (such as palladium hydride, $MgH_2$, $NaAlH_4$, $LiAlH_4$, $LiH$, $LaNi_5H_6$, $TiFeH_2$, etc.) upon reaction with hydrogen. The metal hydride may be recharged, for example, by using hydrogen generated on board the aircraft 1. Since the recharging reaction of metal and hydrogen (e.g., $M+H_2 \rightarrow MH_2$) is exothermic, the remediation unit 166 may include a cooling device that removes heat generated by the reaction to maintain an optimal absorption rate. Oxygen may be supplied to the hydrogen and oxygen supply unit 166c by using unutilized thermal energy (e.g., heat generated by the production of metal hydride) for oxygen concentration or by using an oxygen electrochemical pump utilizing either PEM or solid oxide fuel cell technology.

The fuel cell power plant 160 may also include a transient condition response unit 167 that may respond to a condition (e.g., an undesirable condition) in the fuel cell stack 161. The transient condition response unit 167 may include an air supply port 167a that may receive air (e.g., ram air, compressed air) from an external source, and supply the air to the fuel cell stack 161. In particular, the air supply port 167a may direct the air supply into the cathode side of the fuel cell stack 161 as needed to improve a performance of the fuel cell stack 161. The transient condition response unit 167 may also include an air compressor, blower, fan or pump 167b that generate compressed air to be supplied to the fuel cell stack 161.

In the case of normal flight, the air supply port 167a may be connected to a shaft-connected turbo-charging unit to provide compressed air for anode recirculation, and/or connected to a ram air source to reduce the requirement for cathode air compression. In the case of a stall condition that may cause a loss of ram air, the air compressor 167b (e.g., or other mechanical compression device) may supply compressed air to the fuel cell stack 161 to ensure sufficient cathode flow when ram air pressure is dropping.

The transient condition response unit 167 may also monitor an elevation of the aircraft 1 and provide emergency anode and cathode flows (e.g., via the air supply port 167a or the air compressor 167b) when the aircraft's elevation rate of change exceeds a nominal value.

The transient condition response unit 167 may also include a heating/cooling unit 167c that may heat or cool the fuel cell stack 161 as needed to improve a performance of the fuel cell stack 161. For example, in the condition of loss of temperature control for the fuel cell cabinet 162, the heating/cooling unit 167c may provide emergency heating or emergency cooling in order to hold the fuel cell cabinet 162 in a nominal temperature range.

The fuel cell power plant 160 may also include a fuel cell power plant control unit 168 that may control an operation of the fuel cell power plant 160. The fuel cell power plant control unit 168 may be communicatively coupled (e.g., by wire or wireless) to and thereby control an operation of the sensors 163, sensors 164, fuel cell performance monitor 169, air monitoring and treatment unit 165, remediation unit 166, transient condition response unit 167 and the backup power supply 150.

The backup power supply 150 may provide backup power through energy storage such as by batteries or supercapacitors (e.g., ultracapacitors). The backup power supply 150 may provide electrical power to the aircraft 1, for example, if the fuel cell power plant 168 needs to be shut down. The fuel cell power plant control unit 168 may coordinate an operation of the fuel cell stack 161 and the backup power supply 150 to effectively form a "hybrid" power system that simultaneously draws power from both the fuel cell stack 161 and the power generation devices of the backup power supply 150 (e.g., batteries, supercapacitor, etc.) provide or support a pulse power draw.

The fuel cell power plant control unit 168 may also be communicatively coupled to the APU control unit 148, the hydrogen supply control unit 135 and the backup power supply 150. This coupling may allow these four units to work together to maintain an optimal condition in the electrical power supply system 100 of the aircraft 1. For example, if the sensor 122a in the hydrogen storage tank 122 detects a low level of hydrogen, the hydrogen supply control unit 135 may transmit a signal to the fuel cell power plant control unit 168 which may activate the backup power supply 150.

The fuel cell power plant control unit 168 may include a processing device (e.g., processor, central processing unit (CPU)) for executing instructions to cause an operation (e.g., remediation operation, transient condition response, etc.) to be performed in the fuel cell power plant 160. The fuel cell power plant control unit 168 may also include a memory device (random access memory (RAM), read only memory (ROM), etc.) for storing instructions to be executed by the processor. The memory device may also store other data such as history data and performance data (e.g., hydrogen concentration, temperature, pressure, etc.) collected by the sensors 163 and 164. The processor may access the data in the memory device and perform operations on the data, utilize the data in executing instructions, etc.

Figure 6:
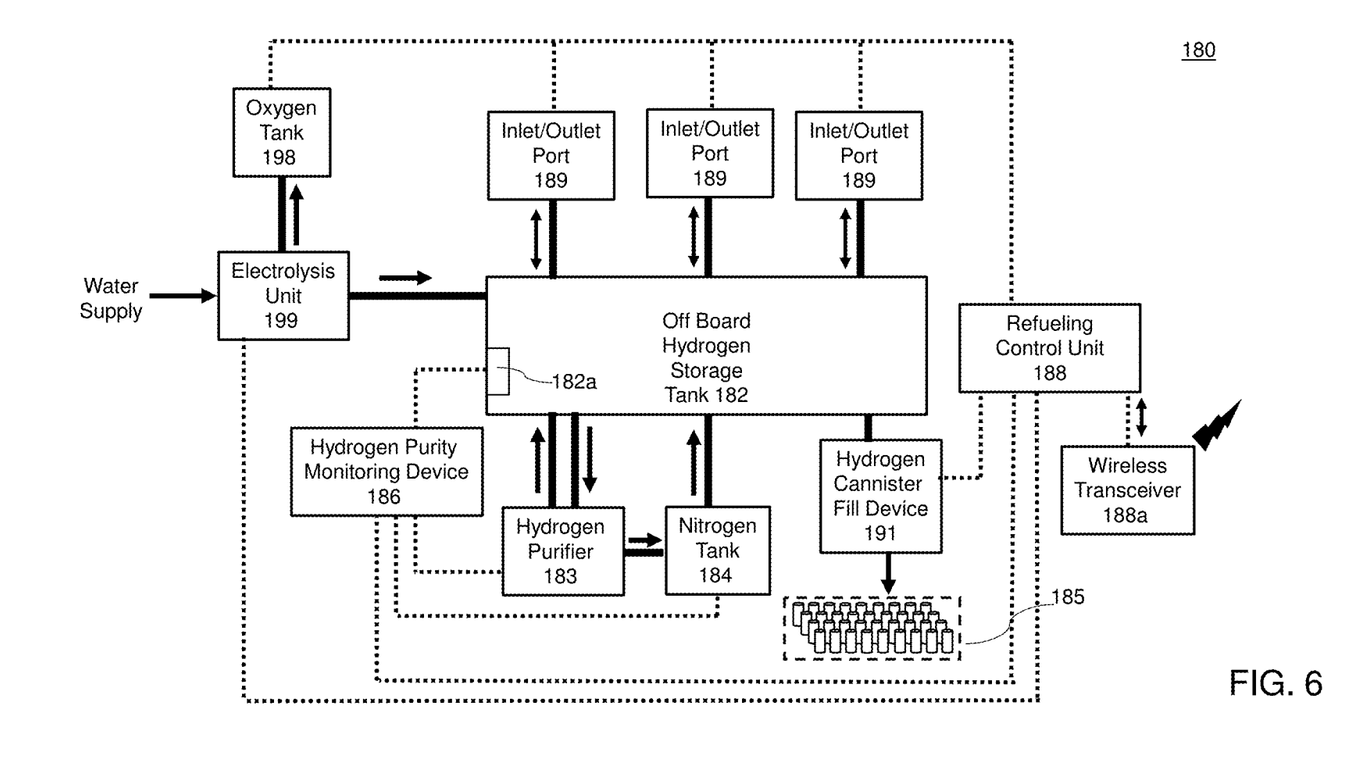
FIG. 6 illustrates a diagram of the off board hydrogen refueling unit, according to one or more embodiments.

FIG. 6 illustrates the off board hydrogen refueling unit 180, according to one or more embodiments. The off board hydrogen refueling unit 180 may store hydrogen that can be used to refuel the aircraft 1. The off board hydrogen refueling unit 180 may also produce hydrogen at the time of refueling, and refuel the aircraft 1 with the produced hydrogen.

The off board hydrogen refueling unit 180 may include one or more off board hydrogen storage tanks 182 for storing the hydrogen. One or more inlet/outlet ports 189 may be connected to the off board hydrogen storage tank 182. Hydrogen and other gases (e.g., nitrogen) may be transferred into and out of the off board hydrogen storage tank 182 via the inlet/outlet ports 189.

The off board hydrogen refueling unit 180 may also include an electrolysis unit 199 that may be connected to a water supply (e.g., municipal water supply). The electrolysis unit 199 may comprise a PEM type electrolyzer configured to perform an electrolysis operation on the water from the water supply to produce hydrogen that may be stored in the off board hydrogen storage tank 182. The oxygen that is produced by the electrolysis operation may be stored in the oxygen tank 198.

The off board hydrogen refueling unit 180 may also include a hydrogen purity monitoring device (e.g., a gas sensor) 186 that may monitor a purity of the hydrogen in the off board hydrogen storage tank 182. The off board hydrogen refueling unit 180 may also include a hydrogen purifier (e.g., any suitable gas purifier device) 183 for purifying the hydrogen stored in the off board hydrogen storage tank 182, and a nitrogen tank 184 that may store nitrogen that has been extracted from the hydrogen by the hydrogen purifier 183. The nitrogen tank 184 may also be coupled to the off board hydrogen storage tank 182, and under certain circumstances, nitrogen from the nitrogen tank 184 may be used to dilute the hydrogen in the off board hydrogen storage tank 182.

The off board hydrogen refueling unit 180 may also include a hydrogen cannister fill device (e.g., a gas pump, blower or conduit) 191 that may transfer hydrogen from the off board hydrogen storage tank 182 (or directly from the electrolysis unit 199) to one or more hydrogen-filled cannisters 185. The hydrogen-filled cannisters 185 may be stored at a location of the off board hydrogen refueling unit 180 and may be used to refuel the aircraft 1 with hydrogen in place of or in supplement to the hydrogen stored in the hydrogen storage tank 182. This may allow for the aircraft 1 to be rapidly refilled and reduce a risk of hydrogen fuel leakage during a refueling operation.

In one embodiment, the hydrogen purifier 183 may include an electrochemical pump or cascade of electrochemical pumping stages that continuously purify the hydrogen stored in the hydrogen storage tank 182. This may be particularly useful in the case that off-gassing (e.g., in the hydrogen storage tank 182) creates impurities in the hydrogen stored therein. The electrochemical pump may comprise a PEM based hydrogen pump that selectively pumps hydrogen across the polymer membrane from one electrode to an opposite electrode.

One or more sensors (e.g., temperature, pressure and/or gas composition sensors) 182a may be disposed in or on the off board hydrogen storage tank 182. The sensors 182a may detect conditions inside the off board hydrogen storage tank 182 such as a concentration of various gases including hydrogen and nitrogen, and may also detect impurities in the hydrogen. The sensors 182a (e.g., low level sensors) may also notify the hydrogen purity monitoring device 186 when a condition in the hydrogen storage tank 182 (e.g., hydrogen purity) is at a boundary of safe operation. The sensors 182a may also detect temperature and pressure in the hydrogen storage tank 182.

The hydrogen purity monitoring device 186 may be electrically coupled to the sensors 182a, the hydrogen purifier 183 and the nitrogen tank 184. The hydrogen purity monitoring device 186 may control an operation of the off board hydrogen storage tank 182, hydrogen purifier 183 and nitrogen tank 184 based on data supplied by the sensors 182a. In particular, the hydrogen purity monitoring device 186 may control an opening and closing of valves for transmitting gases to and from the off board hydrogen storage tank 182, hydrogen purifier 183 and nitrogen tank 184.

The sensors 182a may indicate when a combustible mixture is included in the off board hydrogen storage tank 182, and thus may indicate a "hazard" condition. When the off board hydrogen storage tank 182 does not contain hydrogen or other fuels in a "hazard" condition (e.g., when the off board hydrogen storage tank 182 is backfilled with an inert gas such as nitrogen, argon or helium), then the off board hydrogen storage tank 182 may be indicated to be in a "safe" condition. In particular, the sensors 182a may detect a dangerous hydrogen condition, and may be arranged in a coincidence logic arrangement. For example, a certain percentage of the sensors 182a (e.g., ¾ of the sensors 182a) must indicate "safe" to prove safe, a certain percentage of the sensors 182a (e.g., ⅔ of the sensors 182a) must indicate "danger" to prove danger, etc.

If the hydrogen purity monitoring device 186 determines that the hydrogen in the off board hydrogen storage tank 182 is too low in gas quality (i.e., having too many impurities), then it may direct the hydrogen purifier 183 to process the hydrogen in the off board hydrogen storage tank 182 to increase gas quality, and then continuously or periodically use data from the sensors 182a to re-analyze the stored hydrogen and recertify the hydrogen to confirm that the quality meets aviation hydrogen requirements. The hydrogen purifier 183 may purify (e.g., reprocess) the hydrogen in the off board hydrogen storage tank 182, for example, by liquifying the hydrogen. In particular, the hydrogen purifier may liquefy the hydrogen, re-gasify the hydrogen and then recompress the hydrogen. The hydrogen purifier 183 may also purify the stored hydrogen by performing a drying process by using, for example, a pressure swing adsorption (PSA), thermal swing adsorption (also referred to as temperature swing adsorption) (TSA) or hybrid pressure/thermal swing adsorption (HP/TSA) process in one or more PSA and/or TSA adsorber material beds. The drying process (e.g., by PSA, TSA or HP/TSA) may remove impurities in the stored hydrogen. The hydrogen purifier 183 may also purify (e.g., reprocess) the stored hydrogen by removal of impurities by preferential oxidation of impurities and/or catalytic combustion in a fuel-rich reactor to convert reactive non-hydrogen compounds to $CO_2$ and/or water. The hydrogen purifier 183 may then perform removal of the $CO_2$ and/or water by PSA, TSA or HP/TSA.

The off board hydrogen refueling unit 180 may also include a refueling control unit 188 that controls the overall operation of the off board hydrogen refueling unit 180. The refueling control unit 188 may be electrically coupled to the hydrogen purity monitoring device 186 and may thereby control an operation of the hydrogen purity monitoring device 186. The hydrogen purity monitoring device 186 may also transmit data that it obtains from the sensors 182a, the hydrogen purifier 183 and the nitrogen tank 184 to the refueling control unit 188.

The refueling control unit 188 may, for example, create and/or assemble data such as a record (e.g., automated record) of the hydrogen purity obtained by the hydrogen purity monitoring device 186, and wirelessly transmit that data to the aircraft 1. In particular, the refueling control unit 188 may create a "finger print" by measuring and recording the amount (e.g., percentage) of one or more isotopes of hydrogen including $^1H$, $^2H$ (deuterium), and $^3H$ of the hydrogen that is stored and/or produced by the off board hydrogen refueling unit 180. For example, the hydrogen purity monitoring device may utilize the sensors 182a to perform gas chromatography or other gas concentration analysis to record $H_2$, $O_2$, $CO$, $CO_2$, Ar, He, $CH_4$, $NH_3$ and other gas concentrations while transferring hydrogen from the off board hydrogen storage tank 182 into the aircraft 1.

The refueling control unit 188 may control other operations of the off board hydrogen refueling unit 180 based on data that it obtains from the hydrogen purity monitoring device 186. In particular, the refueling control unit 188 may activate the hydrogen cannister fill device 191 and may control an opening and closing of valves for or transmitting gases to and from the off board hydrogen storage tank 182, hydrogen purifier 183 and nitrogen tank 184.

The refueling control unit 188 may also control an operation of the inlet/outlet ports 189. The refueling control unit 188 may thereby control the transfer of gas onto and off of the aircraft 1 in a refueling operation. The refueling control unit 188 may also control an operation of the electrolysis unit 199 and the oxygen tank 198 (e.g., dispensing oxygen from the oxygen tank 198). That is, the electrolysis unit 199 may produce hydrogen under the control of the refuel control unit 188. For example, the refueling control unit 188 may direct the electrolysis unit 199 to produce hydrogen in the event that the sensor 182a detects a low level of hydrogen in the hydrogen storage tank 182.

The refueling control unit 188 may direct the electrolysis unit 199 to perform water electrolysis at the time of fueling the aircraft 1. Thus, only a water supply (and not stored hydrogen) may be required to be maintained at the off board hydrogen refueling unit 180.

The oxygen generated by the electrolysis unit 199 may be transferred to the aircraft 1 for use in the fuel cell power plant 160. For example, the oxygen may be stored by the hydrogen and oxygen supply unit 166c or by the transient condition response unit 167 for transient (e.g., emergency) conditions when air quality in the fuel cell cabinet 162 is too low. The oxygen may alternatively be transferred to the aircraft 1 for other uses on board such as emergency oxygen for passengers or pilots.

The refueling control unit 188 may include a processing device (e.g., processor, central processing unit (CPU)) for executing instructions to cause an operation (e.g., remediation operation, transient condition response, etc.) to be performed in the off board hydrogen refueling unit 180. The refueling control unit 188 may also include a memory device (random access memory (RAM), read only memory (ROM), etc.) for storing instructions to be executed by the processor. The memory device may also store other data such as history data and performance data (e.g., hydrogen concentration, temperature, pressure, etc.) collected by the sensors 182a. The processor may access the data in the memory device and perform operations on the data, utilize the data in executing instructions, etc.

The refueling control unit 188 may be connected to a wireless transceiver 188a. The wireless transceiver 188a may communicate wirelessly with the hydrogen supply control unit 135 onboard the aircraft 1, to enable communication between the refueling control unit 188 and the hydrogen supply control unit 135. The refueling control unit 188 may thereby coordinate an operation (e.g., hydrogen refueling operation, hydrogen reprocessing operation, etc.) and exchange information about the operation (e.g., time, date, quantity, hydrogen purity level, etc.) with the hydrogen storage unit 120 onboard the aircraft 1.

The refueling control unit 188 may initiate a refueling operation by removing any hydrogen that is being stored on the aircraft 1 while the aircraft 1 is on the ground for enhanced safety. For example, the fuel control unit 188 may direct the hydrogen supply control unit 135 onboard the aircraft 1 to vent the hydrogen storage tank 122 (e.g., using the transient condition response unit 138) to remove the hydrogen remaining therein. In particular, the hydrogen storage tank 122 may be vented into the off board hydrogen storage tank 182 with compressors or electrochemical $H_2$ pumps for transfer compression from the hydrogen storage tank 122 to the off board hydrogen storage tank 182.

The refueling control unit 188 may also direct the hydrogen supply control unit 135 onboard the aircraft 1 to backfill the hydrogen storage tank 122 with some amount of nitrogen to ensure that the hydrogen storage tank 122 cannot contain a combustible mixture.

Then, at the time of refueling, the refueling control unit 188 may direct the off board hydrogen storage tank 182 to "purge" the hydrogen/nitrogen mixture (e.g., "safe" hydrogen) in the hydrogen storage tank 122 onboard the aircraft 1, with pure hydrogen. The refueling control unit 188 may remove the purged hydrogen/nitrogen mixture, store it (e.g., in the off board hydrogen storage tank 182), and purify it by removing the nitrogen using the hydrogen purifier 183. This purification operation may be performed repeatedly (e.g., continuously) to remove the nitrogen from the stored mixture (e.g., in the off board hydrogen storage tank 182).

The off board hydrogen storage tank 182 when empty may be backfilled with an inert gas or mixture of gases such as nitrogen or argon to create a diluted mixture of "forming gas." The forming gas may include, for example, 90% nitrogen and 10% hydrogen which cannot become a combustible mixture. At the time of refueling, the stored "forming gas" may be purified by the hydrogen purifier 183 (e.g., by performing a purifying compression such as electrochemical separation via a PEM stack), and then "pumped" into the hydrogen storage tank 122 onboard the aircraft 1. This may provide the advantage of holding hydrogen in the off board hydrogen storage tank 182 only in a non-combustible form. The nitrogen that is used in the backfilling operation may include nitrogen from the nitrogen tank 184, or nitrogen produced by the off board hydrogen refueling unit 180 via air separation (e.g., in advance of refueling). The nitrogen may alternatively come from the nitrogen tank 124 in the hydrogen storage unit 120 onboard the aircraft, or via air separation (e.g., in advance of refueling; during flight) by the hydrogen storage unit 120.

Figure 7:
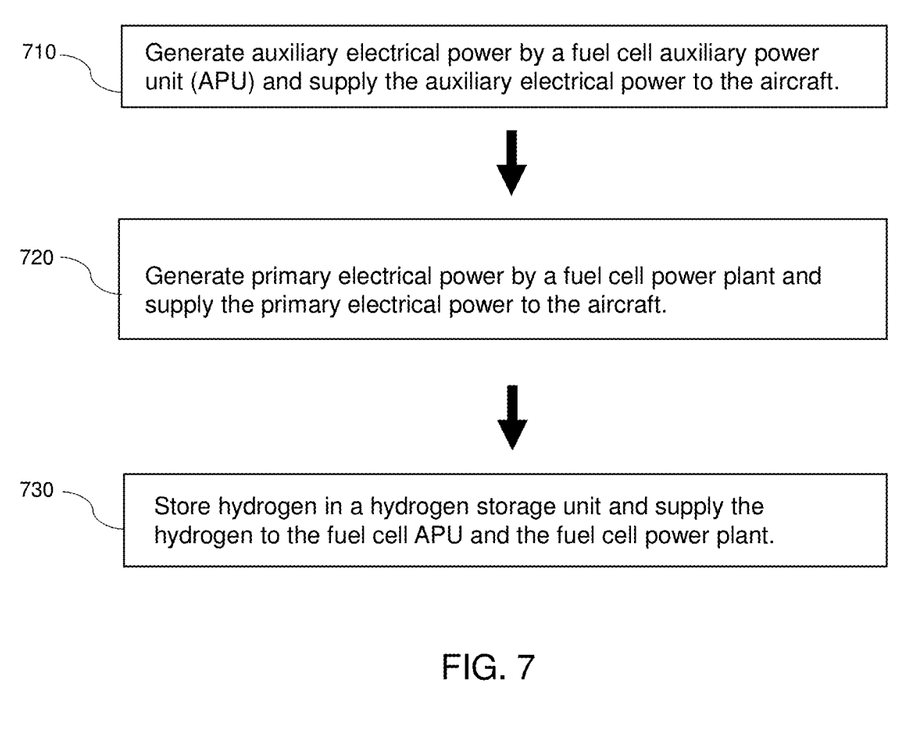
FIG. 7 illustrates flow chart of method of supplying electrical power to an aircraft, according to one or more embodiments.

FIG. 7 illustrates a method of supplying electrical power to an aircraft, according to one or more embodiments. The method may include a Step 710 of generating auxiliary electrical power by a fuel cell auxiliary power unit (APU) and supplying the auxiliary electrical power to the aircraft. The method may also include a Step 720 of generating primary electrical power by a fuel cell power plant and supplying the primary electrical power to the aircraft. The method may also include a Step 730 of storing hydrogen in a hydrogen storage unit and supplying the hydrogen to the fuel cell APU and the fuel cell power plant.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An aircraft electrical power supply system, comprising:
    a fuel cell auxiliary power unit (APU) located on an aircraft that supplies auxiliary electrical power to the aircraft;

a fuel cell power plant located on the aircraft that supplies primary electrical power to the aircraft; and
a hydrogen storage unit located on the aircraft that supplies hydrogen to the fuel cell APU and the fuel cell power plant, wherein the hydrogen storage unit includes a hydrogen storage area, the hydrogen storage area comprising:
a hydrogen storage tank that stores hydrogen; and
an electrochemical pump that continuously purifies the hydrogen stored in the hydrogen storage tank.

2. The aircraft electrical power supply system of claim 1, further comprising an off board hydrogen refueling unit located off the aircraft that refuels the aircraft with hydrogen.

3. The aircraft electrical power supply system of claim 2, wherein the off board hydrogen refueling unit comprises:
an off board hydrogen storage tank that stores hydrogen;
a purity sensor that detects impurities in the hydrogen stored in the off board hydrogen storage tank; and
a hydrogen purifier that purifies hydrogen in which the purity sensor has detected impurities.

4. The aircraft electrical power supply system of claim 3, wherein the hydrogen purifier removes the impurities in the hydrogen by liquifying the hydrogen, re-gasifying the hydrogen and recompressing the hydrogen.

5. The aircraft electrical power supply system of claim 3, wherein the off board hydrogen storage tank stores hydrogen as a forming gas, and the hydrogen purifier is purifies the forming gas when refueling the aircraft.

6. The aircraft electrical power supply system of claim 2, wherein the off board hydrogen refueling unit further comprises an electrolysis unit that generates hydrogen by water electrolysis.

7. The aircraft electrical power supply system of claim 1, wherein the hydrogen storage area further comprises:
a hydrogen storage area control unit that controls the purifying of the hydrogen by the electrochemical pump.

8. The aircraft electrical power supply system of claim 7, wherein:
the hydrogen storage tank comprises a purity sensor configured to detect a purity of the hydrogen in the hydrogen storage tank, and the hydrogen storage area control unit is configured to control the purifying of the hydrogen by the electrochemical pump based on the purity detected by the purity sensor.

9. The aircraft electrical power supply system of claim 1, wherein the aircraft further comprises a gas turbine engine, and the fuel cell APU provides electrical power to a motor-generator which is mounted on a shaft of the gas turbine engine.

10. The aircraft electrical power supply system of claim 1, wherein the fuel cell APU comprises a first fuel cell stack comprising a first plurality of fuel cells that generates the auxiliary electrical power.

11. The aircraft electrical power supply system of claim 10, wherein the aircraft further comprises an electrical power distribution system distributes electrical power to electrical devices on the aircraft, and the first plurality of fuel cells are independently coupled to the electrical power distribution system.

12. The aircraft electrical power supply system of claim 10, wherein the fuel cell power plant comprises:
a second fuel cell stack comprising a second plurality of fuel cells that generates the primary electrical power;
a fuel cell power plant control unit that controls an operation of the fuel cell power plant; and
a fuel cell performance monitor that monitors a performance of the second plurality of fuel cells under the control of the fuel cell power plant control unit.

13. The aircraft electrical power supply system of claim 12, further comprising an electrochemical impedance spectroscopy (EIS) analyzer, wherein the fuel cell performance monitor monitors the performance of the second plurality of fuel cells by performing electrochemical impedance spectroscopy using the EIS analyzer.

14. The aircraft electrical power supply system of claim 12, wherein:
the fuel cell power plant comprises a remediation unit that remedies a condition of the fuel cell power plant; and
the remediation unit comprises:
a humidifier that humidifies the second plurality of fuel cells to remedy a low humidity condition;
a purging device that purges the second plurality of fuel cells of accumulated water; and
a hydrogen and oxygen supply unit that supplies hydrogen or oxygen to the fuel cell.

15. The aircraft electrical power supply system of claim 12, wherein the fuel cell power plant further comprises a transient condition response unit comprising:
an air supply port that provides an air supply to the second fuel cell stack; and
a heating and cooling unit controls the temperature of the second fuel cell stack.

16. A method of supplying electrical power to an aircraft, comprising:
generating auxiliary electrical power by a fuel cell auxiliary power unit (APU) and supplying the auxiliary electrical power to the aircraft;
generating primary electrical power by a fuel cell power plant and supplying the primary electrical power to the aircraft; and
storing hydrogen in a hydrogen storage unit and supplying the hydrogen to the fuel cell APU and the fuel cell power plant.

17. The method of claim 16, further comprising refueling the aircraft with hydrogen from an off board hydrogen refueling unit.

18. The method of claim 17, further comprising:
storing hydrogen as a forming gas in the off board hydrogen refueling unit; and
purifying the forming gas.

19. The method of claim 17, further comprising electrolyzing water in an electrolysis unit to generate the hydrogen.

20. The method of claim 3, wherein the hydrogen purifier comprises a hydrogen dryer that removes impurities in the hydrogen by performing a drying process.

21. The method of claim 20, wherein the drying process is pressure swing adsorption (PSA).

22. The method of claim 20, wherein the drying process is thermal swing adsorption (TSA).

23. The method of claim 20, wherein the drying process is hybrid pressure/thermal swing adsorption (HP/TSA).

24. The method of claim 3, wherein the hydrogen purifier comprises an oxidizer that preferentially oxidizes the impurities.

25. The method of claim 3, wherein the hydrogen purifier comprises a combustor that catalytically combusts the impurities.

* * * * *